United States Patent
Kibel et al.

(10) Patent No.: US 11,586,426 B2
(45) Date of Patent: Feb. 21, 2023

(54) SERVICE RELEASE TOOL

(71) Applicant: ServiceNow, Inc., Santa Clara, CA (US)

(72) Inventors: Danny Kibel, Saratoga, CA (US); James Owen, Cupertino, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/068,431

(22) Filed: Oct. 12, 2020

(65) Prior Publication Data

US 2021/0042103 A1 Feb. 11, 2021

Related U.S. Application Data

(63) Continuation of application No. 15/587,988, filed on May 5, 2017, now Pat. No. 10,809,989.

(51) Int. Cl.
*G06F 9/44* (2018.01)
*G06F 8/60* (2018.01)

(52) U.S. Cl.
CPC ...................... *G06F 8/60* (2013.01)

(58) Field of Classification Search
None
See application file for complete search history.

(56) References Cited

U.S. PATENT DOCUMENTS

| | | |
|---|---|---|
| 6,321,229 B1 | 11/2001 | Goldman |
| 6,678,887 B1 | 1/2004 | Hallman |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |
| 7,716,353 B2 | 5/2010 | Golovinsky |
| 7,769,718 B2 | 8/2010 | Murley |
| 7,925,981 B2 | 4/2011 | Pourheidari |
| 7,933,927 B2 | 4/2011 | Dee |
| 7,945,860 B2 | 5/2011 | Vambenepe |
| 7,996,814 B1 | 8/2011 | Qureshi |
| 8,082,222 B2 | 12/2011 | Rangarajan |
| 8,151,261 B2 | 4/2012 | Sirota |
| 8,380,645 B2 | 2/2013 | Kowalski |
| 8,402,127 B2 | 3/2013 | Solin |
| 8,554,750 B2 | 10/2013 | Rangarajan |

(Continued)

*Primary Examiner* — Insun Kang
(74) *Attorney, Agent, or Firm* — Fletcher Yoder PC

(57) ABSTRACT

Systems and methods are directed to release tools and deployment tools for software applications. A computing device includes a processor operatively coupled to a memory. The processor identifies one or more environments and a plurality of deployment operations to be performed to deploy a software application to the one or more environments. The processor generates a deployment plan having instructions to execute the one or more deployment operations. The processor executes the deployment plan to deploy the one or more release environments. The processor sends signals to a display to display progression through the deployment plan during deployment of the one or more release environments.

20 Claims, 13 Drawing Sheets

(56) References Cited

U.S. PATENT DOCUMENTS

| | | |
|---|---|---|
| 8,612,408 B2 | 12/2013 | Trinon |
| 8,646,093 B2 | 2/2014 | Myers |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 10,929,797 B1* | 2/2021 | Gupta .................. G06F 9/45558 |
| 2003/0135755 A1 | 7/2003 | Chiu |
| 2004/0068715 A1 | 4/2004 | Wong et al. |
| 2004/0261072 A1 | 12/2004 | Herle |
| 2005/0086530 A1 | 4/2005 | Goddard |
| 2008/0256314 A1 | 10/2008 | Anand et al. |
| 2009/0083732 A1 | 3/2009 | Shen et al. |
| 2009/0249279 A1 | 10/2009 | Bourdon |
| 2009/0288081 A1 | 11/2009 | Delahunty et al. |
| 2010/0049962 A1 | 2/2010 | Chen |
| 2010/0058325 A1 | 3/2010 | Macken et al. |
| 2011/0197097 A1 | 8/2011 | Beaty et al. |
| 2011/0219146 A1 | 9/2011 | Jacobson et al. |
| 2012/0089860 A1* | 4/2012 | Zaifman ............ G06F 11/0751 714/2 |
| 2012/0117532 A1* | 5/2012 | Knepper .................. G06F 8/60 717/101 |
| 2013/0290180 A1 | 10/2013 | Baffier et al. |
| 2014/0082281 A1 | 3/2014 | Koenig et al. |
| 2014/0130036 A1* | 5/2014 | Gurikar .................. G06F 8/61 717/176 |
| 2015/0142856 A1 | 5/2015 | Salinas et al. |
| 2016/0019041 A1* | 1/2016 | Smith ...................... G06F 8/61 717/177 |
| 2016/0092185 A1* | 3/2016 | Botti ........................ G06F 8/60 717/103 |
| 2016/0188323 A1* | 6/2016 | Nagaraja .................. G06F 8/61 717/101 |
| 2016/0210172 A1 | 7/2016 | Ramachandra et al. |
| 2016/0239280 A1 | 8/2016 | Scheiner et al. |
| 2016/0307129 A1 | 10/2016 | Thomas et al. |
| 2017/0206076 A1 | 7/2017 | Naqvi et al. |
| 2017/0228227 A1 | 8/2017 | Winterfeldt et al. |
| 2017/0337051 A1 | 11/2017 | Bertani et al. |
| 2018/0011697 A1* | 1/2018 | Berkebile .......... G06Q 10/0631 |
| 2018/0032362 A1 | 2/2018 | Buil et al. |
| 2018/0165122 A1* | 6/2018 | Dobrev .............. G06F 9/45558 |
| 2018/0203680 A1* | 7/2018 | Nakanoya ................. G06F 9/48 |
| 2018/0275986 A1* | 9/2018 | Ghosh ...................... G06F 8/70 |
| 2018/0307481 A1 | 10/2018 | Ganesan et al. |
| 2018/0336018 A1 | 11/2018 | Lu et al. |
| 2019/0026108 A1* | 1/2019 | Byrd ........................ G06F 8/75 |
| 2019/0281139 A1 | 9/2019 | Owen et al. |
| 2020/0159573 A1* | 5/2020 | Dobrev ................ G06F 9/5038 |

\* cited by examiner

| OVERVIEW | PHASES | ENVIRONMENT BLUEPRINTS | ENVIRONMENTS | PACKAGE TEMPLATES | PACKAGES | RELEASE TEMPLATES | RELEASES |

≡ RELEASE TEMPLATES  [NEW]—368

| NAME | RELEASE TYPES | STATUS | LAST UPDATED BY | LAST UPDATED ON | CREATED BY | CREATED ON |
|---|---|---|---|---|---|---|
| ⓘ PATCH RELEASE TEMPLATE | PATCH | CHECKED IN | SYSTEM | 2017-01-19 09:44:11 | ADMIN | 2017-01-12 16:54:46 |
| ⓘ MINOR RELEASE TEMPLATE | MINOR | CHECKED IN | SYSTEM | 2017-01-19 09:44:11 | ADMIN | 2017-01-12 16:56:18 |
| ⓘ MAJOR RELEASE TEMPLATE | MAJOR | CHECKED IN | SYSTEM | 2017-01-19 09:44:11 | ADMIN | 2017-01-12 16:54:12 |

≡ SRA CHANGE CONDITION
NEW RECORD                                                    ⌸ ⇅ ⋯ [SUBMIT]

⟵ 540

NAME            [                    ]
ACTIVE          ☑
ORDER           [        100        ]
CONDITION       ALL OF THESE CONDITIONS MUST BE MET
                [KEYWORDS ▽] [ARE ▽] [              ] ⊖ [OR] [AND]
                OR
                ALL OF THESE CONDITIONS MUST BE MET
         542 ⎡ [ENVIRONMENT.NAME ▽] [CONTAINS ▽] [PRODUCTION] ⊖ [OR] [AND]
             ⎣[AND] [—CHOOSE FIELD—▽] [            ] [         ] ⊖ [OR] [AND]
                                                    544 ⟶
                [OR]
                [NEW CRITERIA]

AUTO-APPROVE     ☐
ADVANCED         ☐
*CHANGE TEMPLATE                                                         [🔍]
NOTES    ◇ ☐ 🗏 ✕ 🗎 | 🔍 ∨ < | 🖼 🕒 | 🗓 ⚙ 🔍
         1  //POPILATE THE 'ANSWER' VARIABLE WITH ADDITIONAL COMMENTS
         2  //YOU CAN USE THE 'CURRENT' RECORD TO ACCESS THE CALLING CONTEXT (DEPLOYMENT EXECUTION RECORD)
         3
         4  ANSWER = "";

[SUBMIT]

FIG. 14

SERVICE RELEASE TOOL

CROSS-REFERENCE TO RELATED APPLICATION(S)

This application is a continuation of U.S. patent application Ser. No. 15/587,988 filed on May 5, 2017, the content of which is herein expressly incorporated by reference for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A software application may include computer executable instructions that perform certain tasks, functions, or activities for one or more users. After development, the software application is often packaged into a product that is then provided to the users in the form of a release. Releasing the product can be a complex process that depends on various factors, such as where the application is being released and versions of the application, among others. To further increase the complexity of releasing software, different deployment methods may be used deploy the computer executable instructions to different environments. Development tools may help speed up the rate at which software developers can develop new or updated features in the software applications, but releasing and deploying the software application to the environments may still depend on conventional tools, which may cause a bottleneck in the software development process. As such, these conventional tools used to provide a release and deploy the software application may cause delays in giving the users the desired features in the software application. Moreover, there may be a lack of feedback in the release and deployment process as to why software releases and/or deployments are delayed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments of the present disclosure are directed to release tools and deployment tools for software applications. Some software applications are developed on and updated on an ongoing basis. As new features and improvements to the software are developed, these features and improvements are provided to users in a new version referred to as a release.

Embodiments described below may include a computing device that performs the releases and deployments of the software application. The computing device may include a processor operatively coupled to a memory. The processor may identify one or more release environments associated with a plurality of configuration items (CIs). The processor may automate at least one package build for the one or more release environments. The package build may include one or more data sets for the plurality of CIs. The processor may deploy the one or more release environments such that the one or more data sets are employed with the plurality of CI's. The processor may detect a change request generated based at least on the deployment of the one or more release environments. The processor may run an automated change process to continue the deployment of the one or more release environments.

In another embodiment, the processor may identify one or more environments. The processor may identify a plurality of deployment operations to be performed to deploy a software application to the one or more environments. The processor may generate a deployment plan that includes instructions to execute the one or more deployment operations. The processor may then execute the deployment plan to deploy the one or more release environments. The processor may display progression through the deployment plan during deployment of the one or more release environments.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is an example of a screenshot displaying a user interface to manage a list of release templates, in accordance with an embodiment;

FIG. 6 is an example of a screenshot displaying a user interface to edit a release template, in accordance with an embodiment;

FIG. 14 is an example of a screenshot displaying a change condition screen that allows conditions to be added to prior to deploying, in accordance with an embodiment.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Aspects of the present disclosure describe service release tools that may be used to provide releases of software and/or hardware. For example, a software application may include one or more features that are provided to a user in the form of a release. The features may be changes or additions (e.g., new versions) to the software application from a previous release or in a new product. Such features may include added or removed functionality, security updates, bug fixes, or the like. Upon making the desired changes to the software application, the software application may be provided to the users through a release process. However, the release process may cause difficulties in providing the release to the users due to errors and/or delays in the release process.

The systems and methods described below are related to tools for enabling releases of software applications to be performed in a faster, more consistent, and reliable manner. Further, the systems and methods may aid in deploying the software applications to the environments which can reduce delays to the release process. Additionally and/or alternatively, tools may be used to identify the errors in the release process and provide feedback regarding bottlenecks caused by the errors. In some embodiments, the systems and methods may provide additional security to the release process.

Figure 1:
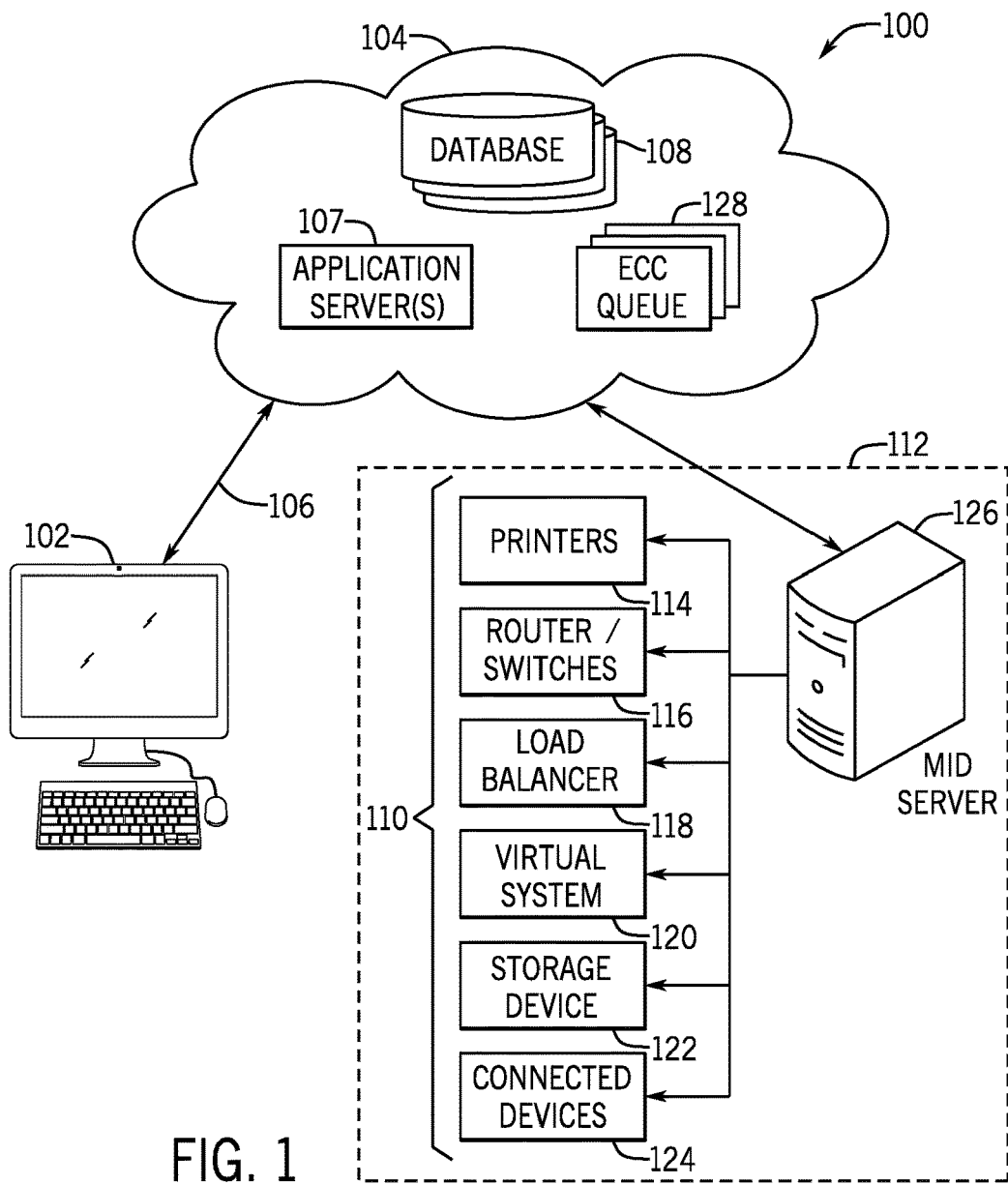
FIG. 1 is a block diagram of a distributed computing system used in performing a release, in accordance with aspects of the present disclosure.

By way of introduction to the present concepts and to provide context for the examples discussed herein, FIG. 1 is a block diagram of a system 100 that utilizes a distributed computing framework, which may perform one or more of the techniques described herein. As illustrated in FIG. 1, a client 102 communicates with a platform 104, such as a cloud service platform, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together using one or more networks. For instance, the platform 104 may include various computers acting as servers in datacenters at one or more geographic locations where the computers communicate using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or one or more databases 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from the databases 108 and/or a database server.

The databases 108 may contain a series of tables containing information about assets and enterprise services controlled by a client 102 and the configurations of these assets and services. The assets and services include configuration items (CIs) 110 that may be computers, other devices on a network 112 (or group of networks), software contracts and/or licenses, or enterprise services. The CIs 110 may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models). As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and the like. The databases 108 may include information related to CIs 110, attributes (e.g., roles, characteristics of elements, etc.) associated with the CIs 110, and/or relationships between the CIs 110.

In some embodiments, the databases 108 may include a configuration management database (CMDB) that may store the data concerning CIs 110 mentioned above along with data related various IT assets that may be present within the network 112. In addition to the databases 108, the platform 104 may include one or more other database servers. The database servers are configured to store, manage, or otherwise provide data for delivering services to the client 102 over the communication channel 106. The database server may include one or more additional databases that are accessible by the application server 107, the client 102, and/or other devices external to the additional databases. The additional databases may be implemented and/or managed using any suitable implementations, such as a relational database management system (RDBMS), a time series database management system, an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely.

In the depicted topology, access to the CIs 110 from the platform 104 is enabled via a management, instrumentation, and discovery (MID) server 126 via a communication channel, such as an external communications channel queue 128. The MID server 126 may include an application program (e.g., Java application) that runs as a service (e.g., Windows service or UNIX daemon) that facilitates communication and movement of data between the platform 104 and external applications, data sources, and/or services. The MID service 126 may be executed using a computing device (e.g., server or computer) on the network 112 that communicates with the platform 104. As discussed below, the MID server 126 may periodically or intermittently use discovery probes to determine information on devices connected to the network 112 keep the information related to connected CIs 110 current. In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The communication queue 128 may be a database table that is typically queried, updated, and inserted into by other systems. Each record in the ECC queue 128 is a message from an instance in the platform 104 to a system (e.g., MID server 126) external to the platform 104 that connects to the platform 104 or a specific instance 130 running in the platform 104 or a message to the instance from the external system. The fields of a communication queue 128 record include various data about the external system or the message in the record.

Although the system 100 is described as having the application servers 107, the databases 108, the communication queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems (or computer systems in general) may communicate with the platform 104 in addition to the MID server 126 and/or may be used to implement the present approach.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

Figure 2:
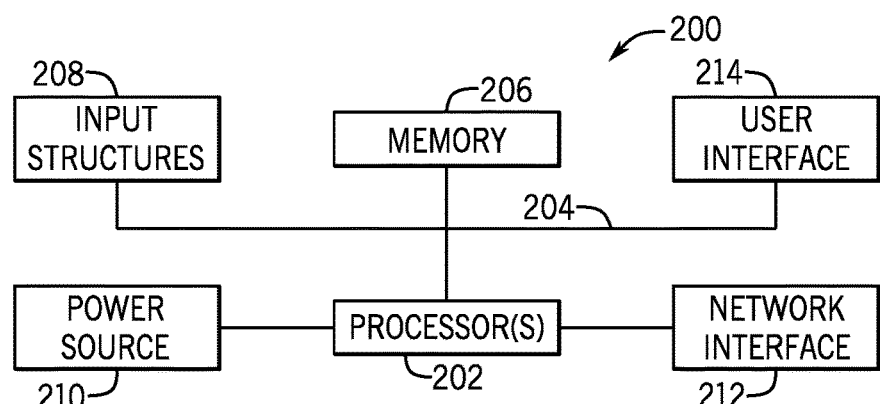
FIG. 2 is a block diagram of a computing device in the distributed computing system of FIG. 1, in accordance with aspects of the present disclosure.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., databases 108), other servers or processor-based hardware devices present in the platform 104 (e.g., server hosting the communication queue 128), a device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processor capable of performing instructions stored in the memory 206. For example, the one or more processors may include microprocessors, system on a chips (SoCs), or any other circuitry performing functions by executing instructions stored in the memory 206 or another accessible location. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, and the like.

Figure 3:
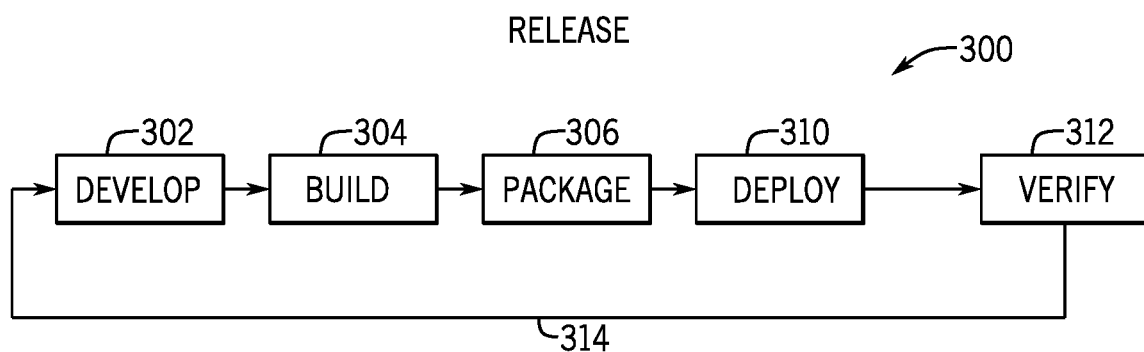
FIG. 3 is a flow diagram of a release process to perform the release, in accordance with aspects of the present disclosure.

With the preceding in mind, FIG. 3 is a process flow diagram that shows a release process 300 that may be implemented in a distributed computing environment as shown in FIG. 1 and/or via a processor-based system as described in FIG. 2 to release or update a software application as discussed herein. For example, new features may be developed for the software application (block 302). The software application may include any suitable application that is being released to users. The software application may be built, or compiled into processor-executable instructions (block 304). Next, the software application may be included (block 306) into a package, which may include the processor-executable instructions of the software application, such as a binary or non-binary source code, as well as metadata, such as stories completed in the application. In some embodiments, the release process 300 may include provisioning the software application. Further, the release process 300 includes deploying (block 310) the software application to one or more release environments. The release process 300 may further include verifying (block 312) the deployment, which may include running unit tests, performing load tests, or the like. The release process 300 may include providing feedback regarding the release of the software application, as indicated by reference number 314. Performing the release process 300 above may cause difficulties in providing the release. For example, the complexity of the release process 300 may cause errors and/or delays in the release. Further, inconsistencies in the release process 300 may be difficult to track.

The systems and methods described below may be performed via computer-readable instructions and circuitry on the computing device 202 and/or the above computing framework (e.g., the application servers 107, the database 108, the MID server 126, etc.). The systems and methods may be used to remove bottlenecks, improve consistency in deployment, and improve the speed at which releases may be deployed.

Figure 4:
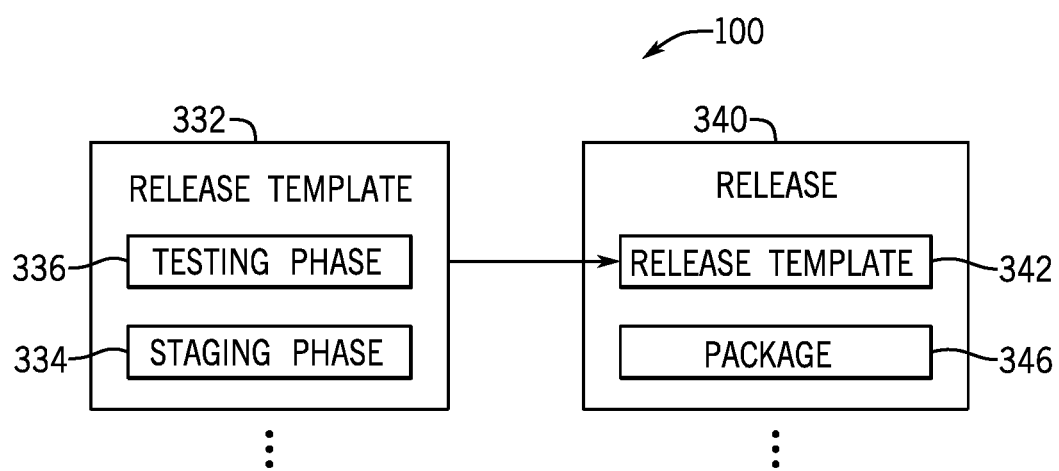
FIG. 4 is a block diagram of release templates and releases used in the distributed computing system, in accordance with an embodiment.

FIG. 4 is an example of a block diagram depicting aspects of a system 320 for managing releases of a software application. The system 320 may include a release template 332 that has a set of workflows 334 and 336 that may be performed in a given deployment phase. Each of the workflows 334 and 336 may include one or more activities that may be performed. The activities in workflows 334 and 336 may include running scripts, manipulating records, waiting for a set period of time, or logging an event. Workflows 334 and 336 may further include conditions as to whether an activity is performed.

The system 320 may include a release 340 that is associated with a selected release template 342 and a selected package 346. As mentioned above, the package 346 may include processor-executable instructions of the software application being released as well as meta-data. The release 340 may be created according to the workflows 334 and 336 of the selected release template 342.

Different release templates 332 may be used, for example, based on whether the release is a patch release, major release, or minor release. Each release template 332 may include a set of workflows 334 and 336 that may each be associated with a deployment phase. For example, the testing phase workflow 336 may be associated with a testing phase, the staging phase workflow 334 may be associated with a staging phase, and a production workflow may be associated with a production phase. Further, each of the phases may include one or more environments to which the releases may be deployed. For instance, the testing phase may include a development environment, a quality assurance (QA) environment, and a testing environment, to which the release may be deployed.

FIG. 5 is an example of a release application user interface screen 360 that includes a table 362 having various release templates to be used in releases of software applications. The table 362 includes a patch release template 364, major release template 366, and minor release template 368 to enable customization based on the amount of changes in the release and/or speed at which the release is to occur. Further, the release application user interface 360 may receive a selection to add a new release template 368.

Figure 6:
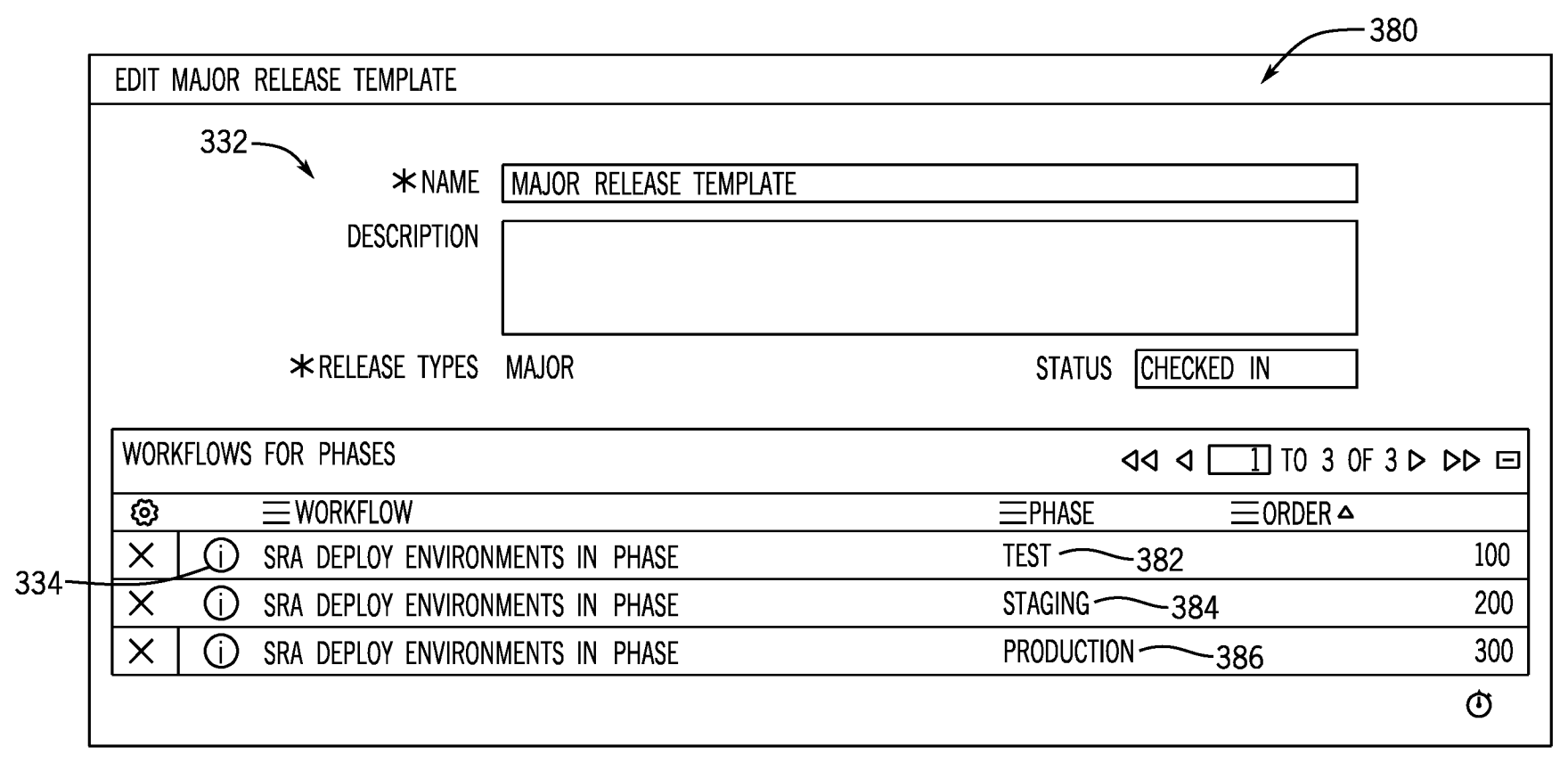

FIG. 6 is an example of a release application user interface screen 380 for editing or adding a release template 332. The release template 332 may be associated with one or more workflows 334, such as a workflow of a test phase 382, a workflow of a staging phase 384, and a workflow of a production phase 386. For example, the release template 332 may be associated with executing instructions to perform activities of each of the workflows 334 when performing a release of the respective phases 382, 384, and 386. Upon creating the release template 332, the release template 332 may then be applied to a release 340.

Figure 7:
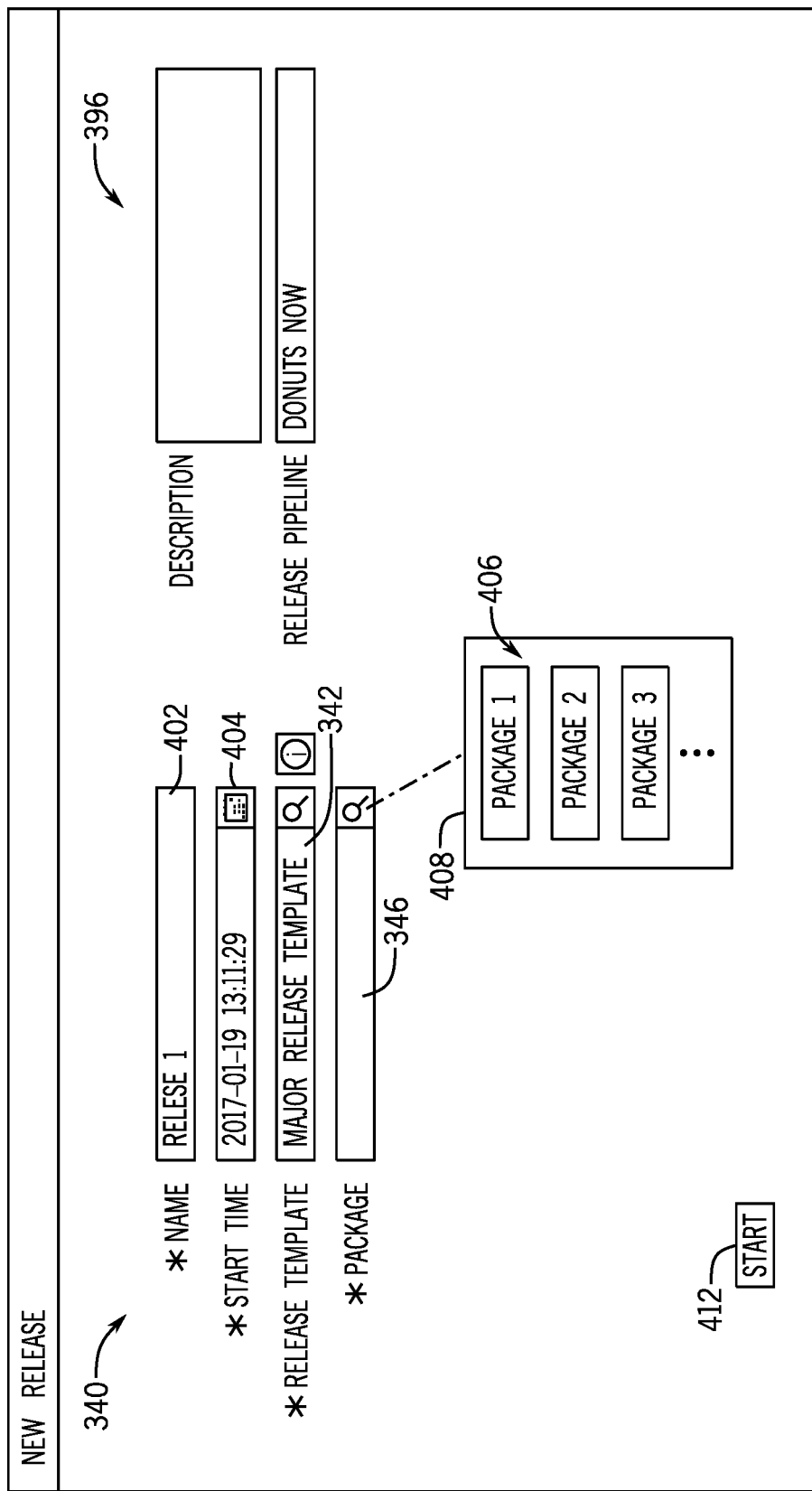
FIG. 7 is an example of a screenshot displaying a user interface to start a release, in accordance with an embodiment.

FIG. 7 is an example of a release application user interface screen 396 for performing the release 340. The processor 202 may receive inputs of a name 402 and a start time 404 as well as a selected release template 342 and the package 346. For example, the package 346 may be selected from a list 406 of packages on an overlay 408. Upon completing fields of the release 340, the processor 202 may start the release via the start button 412. That is, the processor 202 may execute the instructions to perform each of the activities of each of the respective workflows 334 to perform the release 340 of the product. For example, the processor 202 may automate the at least one package build for the one or more release environments. The package build may include one or more data sets of a plurality of CIs. For example, the data sets may include .war files, application configuration properties, sql scripts, or other workflows. The data sets may be executed to perform the release 340. In some embodiments, a progression may be provided indicating progress through each of the workflows 334 to perform the release 340. Each of the fields (e.g., name 402, start time 404, release template 342, package 346) may be referred to as CIs and may depend on the particular implementation. As mentioned above with respect to FIG. 3, part of the release process 300 includes deploying (block 310) the one or more release environments. Below is a process that may be performed by the one or more processors 202 of the system 320 during deployment of the one or more release environments.

Figure 8:
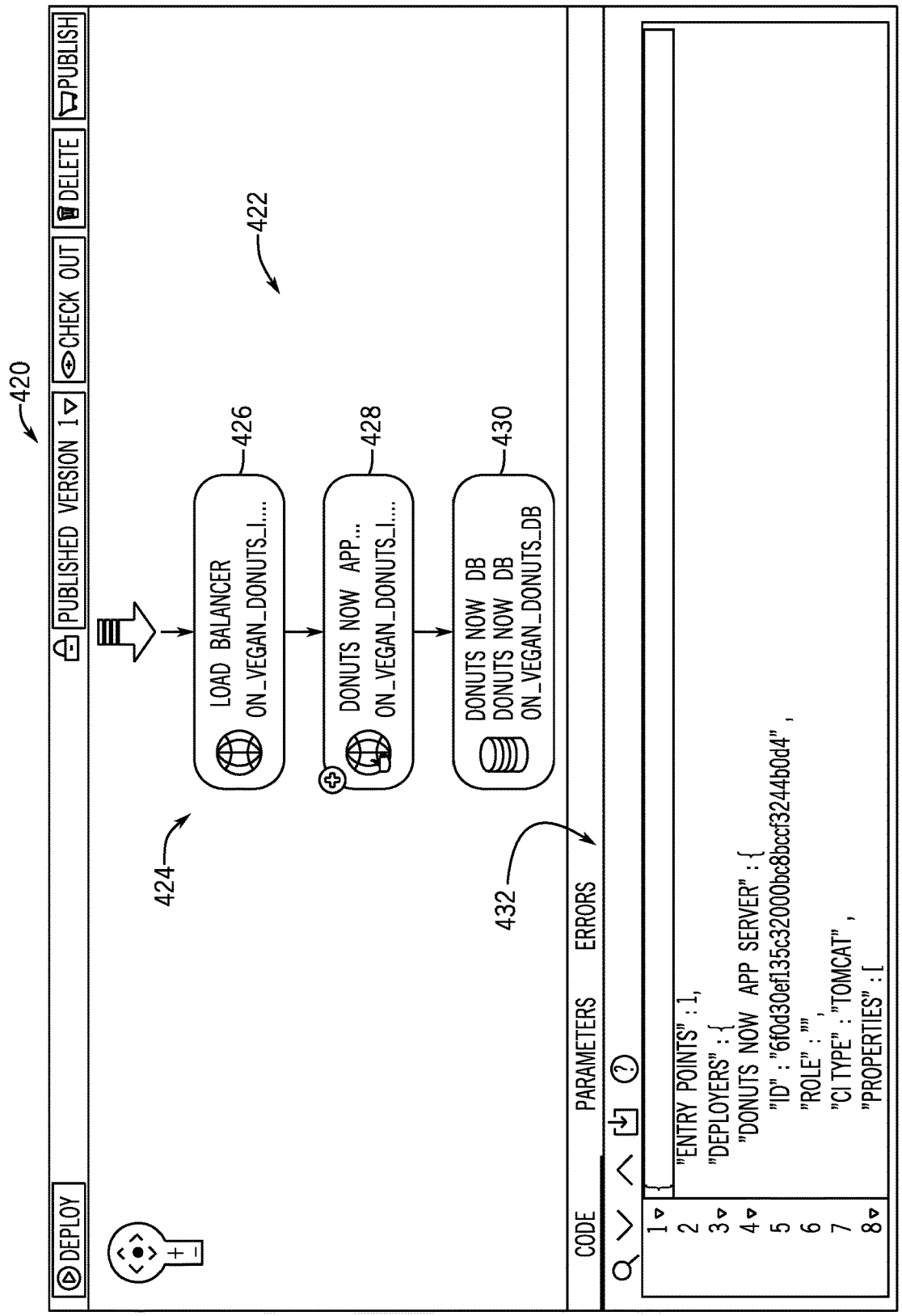
FIG. 8 is an example of a screenshot displaying a deployment plan, in accordance with an embodiment.

FIG. 8 is an example of a deployment user interface screen 420 for deploying the one or more release environments shown via a display of the computing device 202 of the client 102. The user interface screen 420 includes a deployment designer 422 that receives inputs from a user to determine a deployment plan 424. The one or more processors 202 may receive inputs of one or more deployment operations via the deployment designer 422. Each of the one or more deployment operations may include a set of deployment tasks to perform when deploying the software application to the one or more environments. The deployment tasks may include stopping a service, starting a service, configuring an application, downloading data, or any other suitable functions. The deployment operations may include installing one or more applications to the environment. For example, the deployment operations may include installing load balancer, middleware, databases, and containers, among others. In addition to the deployment designer 422, customized instructions (e.g., code, parameters, etc.) may be included in the deployment plan 424 via the menu 432. In the illustrated embodiment, the deployment operations include installing a load balancer 426, installing a web application server 428, and installing and/or setting up a database 430. Further, the one or more processors 202 may receive inputs to add, remove, or edit a deployment operation via the deployment designer 422.

Figure 9:
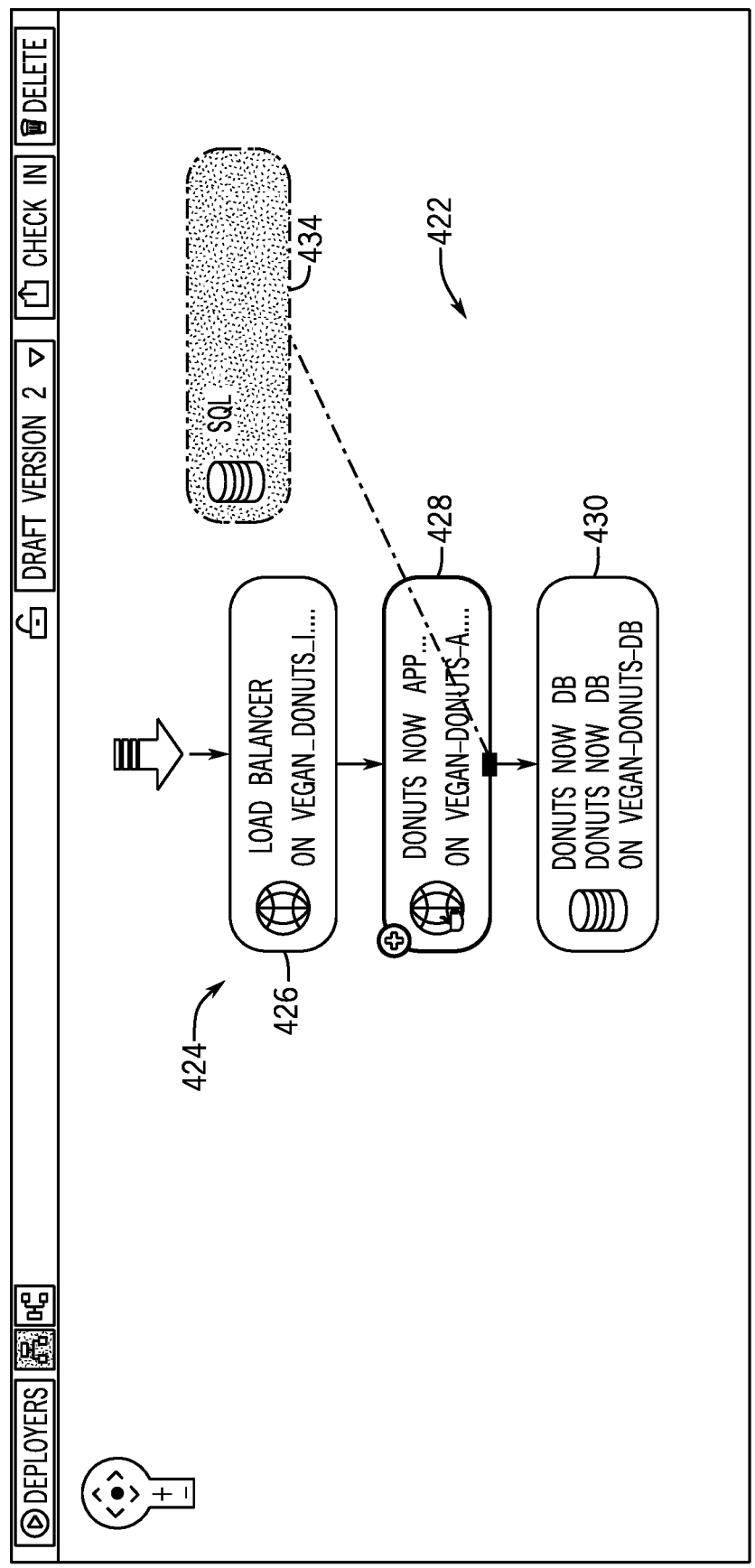
FIG. 9 is an example of a screenshot displaying a deployment operation being added to the deployment plan, in accordance with an embodiment.

FIG. 9 is an example of the deployment user interface screen 420 in which the processor 202 receives inputs via the input structures 208 to add an additional deployment operation to the deployment plan 424 using the deployment designer 422. For example, the deployment designer 422 may receive an input of a selection of a SQL database that is to be installed after the web application 428. The processor 202 may then generate a deployment plan 424 having instructions to perform the deployment according to the received inputs via the deployment designer 422.

Figure 10:
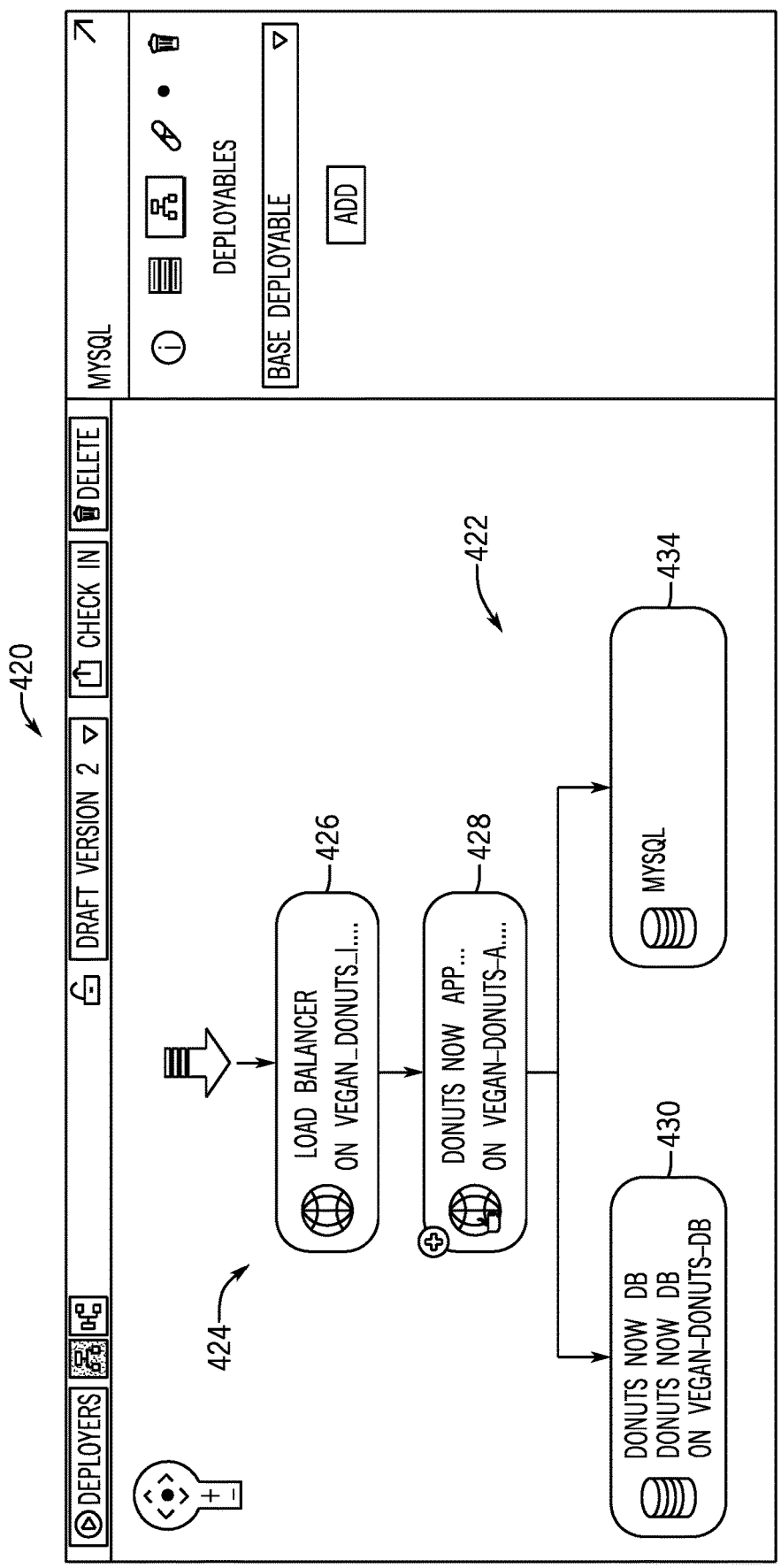
FIG. 10 is an example of a screenshot displaying an updated deployment plan including the deployment operation added in FIG. 9, in accordance with an embodiment.

FIG. 10 is an example of the deployment user interface screen 420 having a deployment plan 424 updated to include the SQL database 434. The processor 202 may update the deployment plan 424 as the computing device 200 receives selections in the deployment designer 422. In the illustrated embodiment, the processor 202 may generate the deployment plan 424 based on user input of dragging and dropping graphical icons and/or connecting the graphical icons to other deployment operations in the deployment plan 42. For example, the SQL database 434 may be associated with default deployment operations which may be incorporated into the deployment plan with dependencies based on placement and/or connections of the graphical icons.

Figure 11:
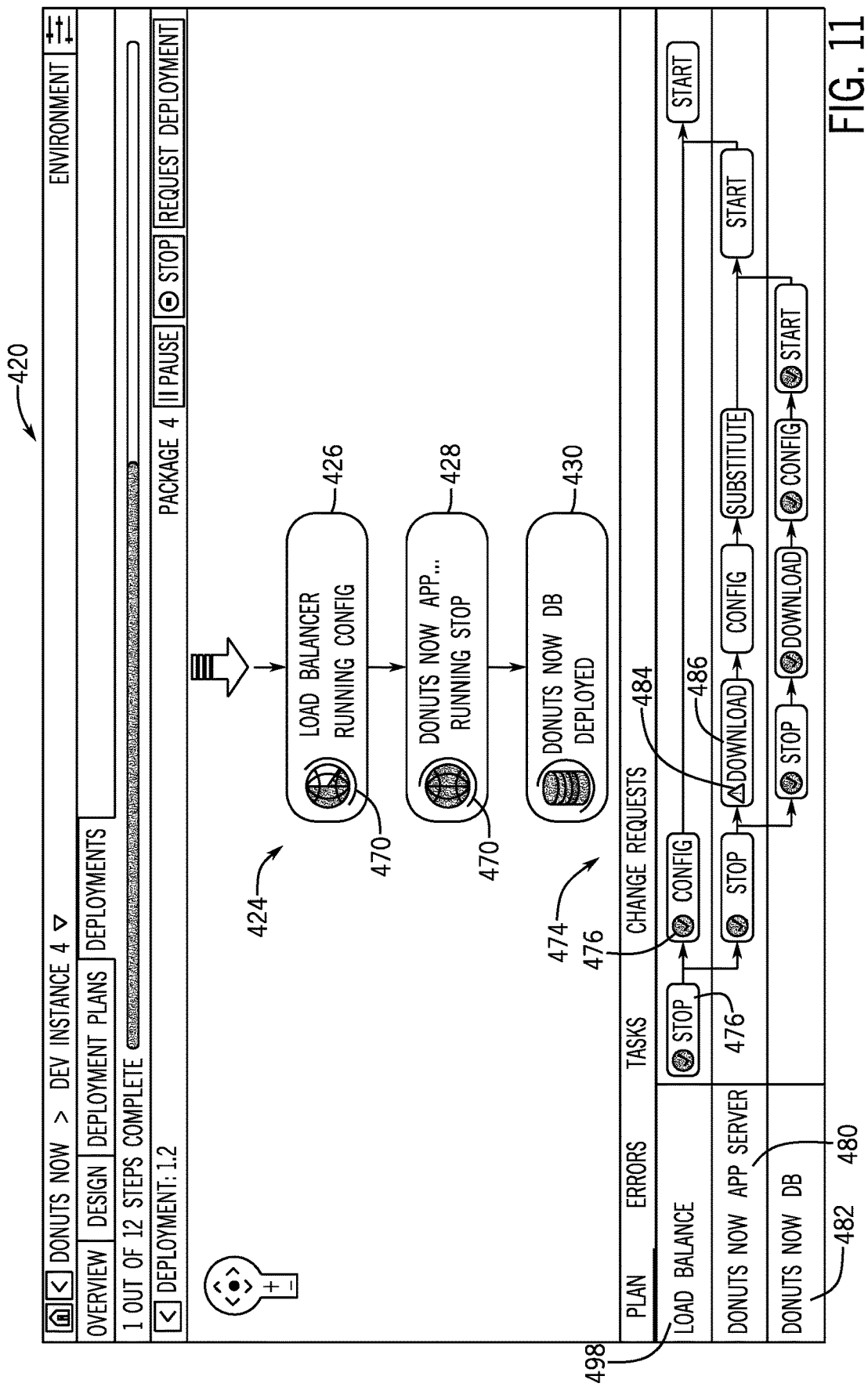
FIG. 11 is an example of a screenshot displaying a chart of deployment tasks of each deployment operation, in accordance with an embodiment.

FIG. 11 is an example of the deployment user interface screen 420 during deployment of the one or more environments. The processor 202 may send signals to the display of the computing device 200 to display progression of the deployment plan 424 as the deployment plan 424 is executed. The processor 202 may send signals to the display to display the load balancer 426 and the web application server 428 graphical icons as in an in-progress 470 state. Similarly, the processor 202 may cause the display to display the deployment operations graphical icons as in a yet-to-begin or completed state.

The processor 202 may send signals to the display of the computing device 200 to display a chart 474 of specific tasks 476 of each of the deployment operations (e.g., load balancer operation 478, app server operation 480, and database operation 482). Further, when an error occurs during execution of the deployment, the processor 202 may provide a notification indicating the error that occurred. For example, the processor 202 may send signals to the display of the computing device 200 to display an error icon 484 on a task, such as a download task 486, in which the deployment is prevented from completing. In the illustrated example, the deployment may have been prevented due to lack of space on a hard drive of the server. Due to the issue during the deployment, the processor 202 may generate a task associated with the deployment issue. Upon completing the task, the processor 202 may restart the deployment according to the deployment plan.

Figure 12:
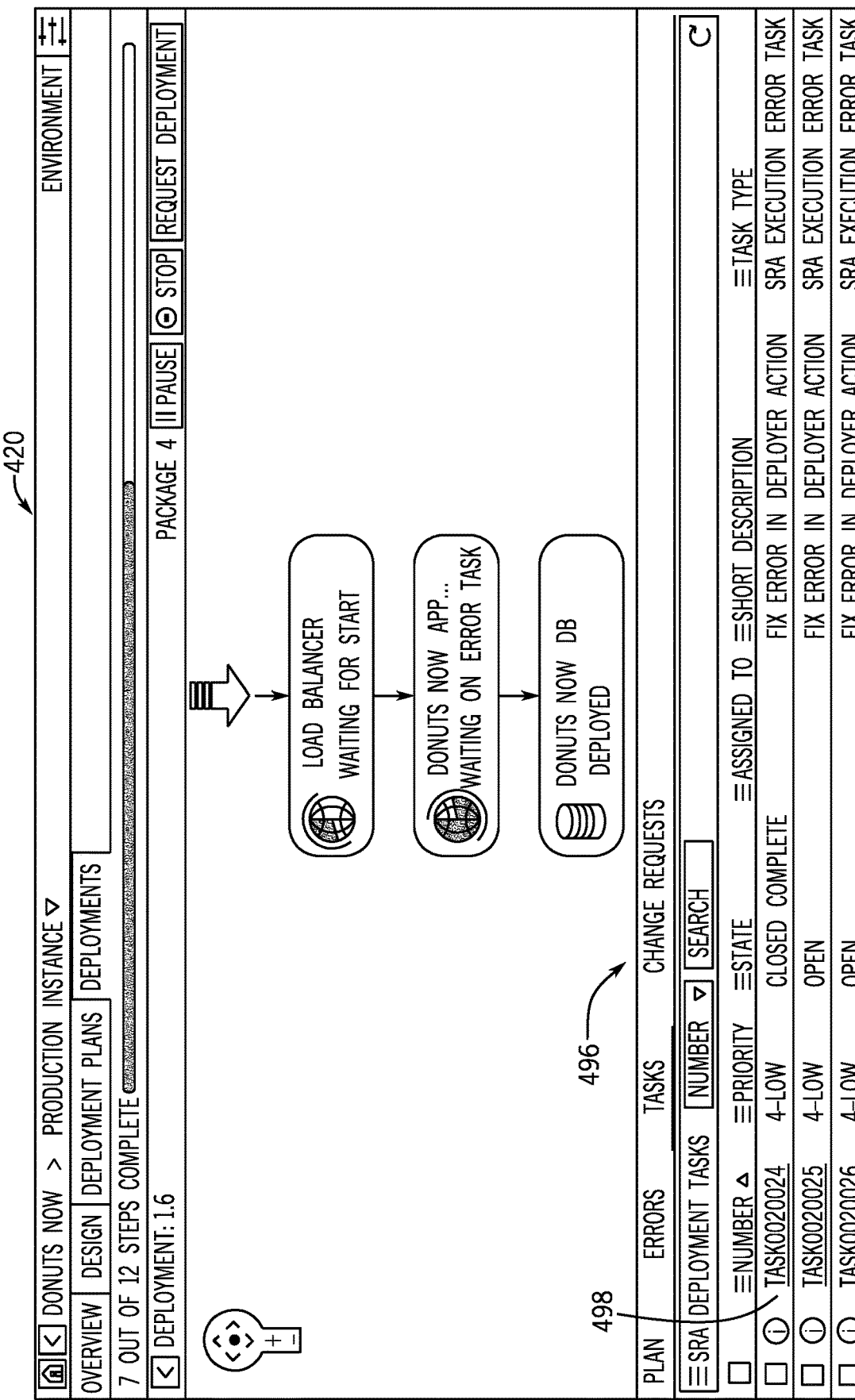
FIG. 12 is an example of a screenshot displaying tasks associated with issues in the deployment process, in accordance with an embodiment.

FIG. 12 is an example of the deployment user interface 420 having a list 496 of tasks 498 associated with issues in the deployment process. The processor 202 may generate the task 498 to be assigned to the appropriate worker to address the issue. For example, a developer may free up disk space on the hard drive to ensure that there is adequate space on the hard drive for deployment. The computing device may then receive an input indicating that the task 498 has been completed. Upon receiving an indication that the task 498 has been completed, the processor 202 may begin redeploying the one or more environments. The processor 202 may identify tendencies in the deployment process by creating tasks 498 associated with the deployment process and tracking issues that arise during deployment. Further, by tracking where the issues occur and when the issues occur via notifications and tasks, the deployment process can avoid delays resulting in faster deployments.

Figure 13:
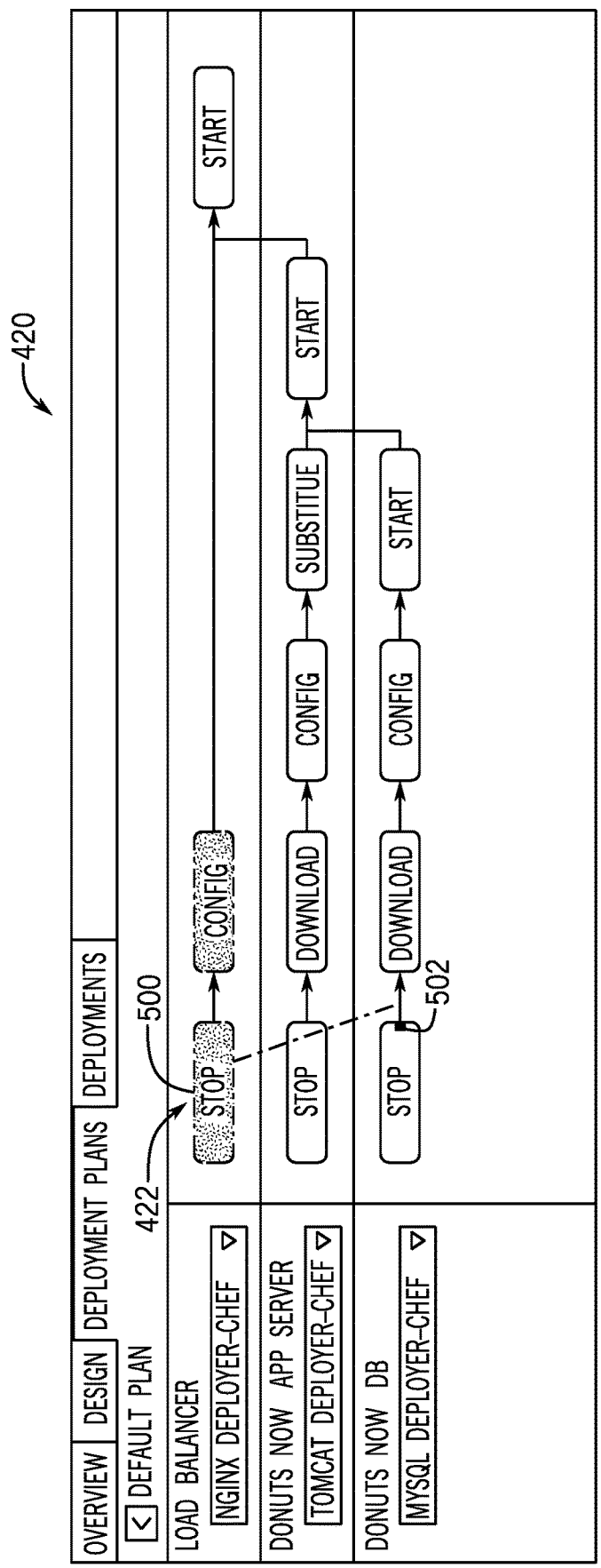
FIG. 13 is an example of a screenshot displaying a chart of deployment tasks of each deployment operation being edited in a deployment designer, in accordance with an embodiment.

FIG. 13 is an example of the deployment user interface 420 having the chart 474 of the deployment operations. The processor 202 may identify relationships between each of the specific tasks 476 in the deployment designer 422 based on inputs into the deployment user interface 420. As an example, the processor 202 may receive a selection of a first specific task 500 of a load balancer operation 478 and a second specific task 502 of a database operation 502 where the selection indicates that the first specific task 500 is dependent upon completion of the second specific task 502. The processor 202 may then adjust the deployment plan such that the first specific task 500 is scheduled to complete after the second specific task. As mentioned above, these selections may be performed via graphical icons on the graphical user interface of the deployment designer 422.

In some embodiments, to deploy certain environments, security features may be employed to ensure that deployments are managed properly. For example, many software applications have a production environment with which users may interact. Making changes to the production environment may cause difficulties for these users. As described below, the processor 202 may detect a change request generated based at least on the deployment of the one or more release environments.

FIG. 14 is an example of a change condition user interface 540 that may be used to create an automated change process to control deployments of the one or more environments. The change condition user interface 540 may include a list of conditions 542 that may be employed to prevent or limit access to deploying the one or more environments. The conditions 542 may include a set of rules that are created for controlling deployment of the one or more environments. In the example shown in FIG. 15, the processor 202 may receive a change condition that requires approval from a user when deploying a production environment 544. That is, upon setting a change condition, the processor 202 may detect the change condition during the deployment and not proceed with the deployment until the processor 202 receives approval of the deployment. The processor 202 may limit which users may deploy the one or more release environments. For example, the users allowed to deploy the software application may to the one or more environments may be limited based on role-based access control or groups of users having particular permissions. The processor 202 may then run the automated change process to continue the deployment of the one or more release environments upon receiving approval of the deployment from the allowed user.

Figure 15:
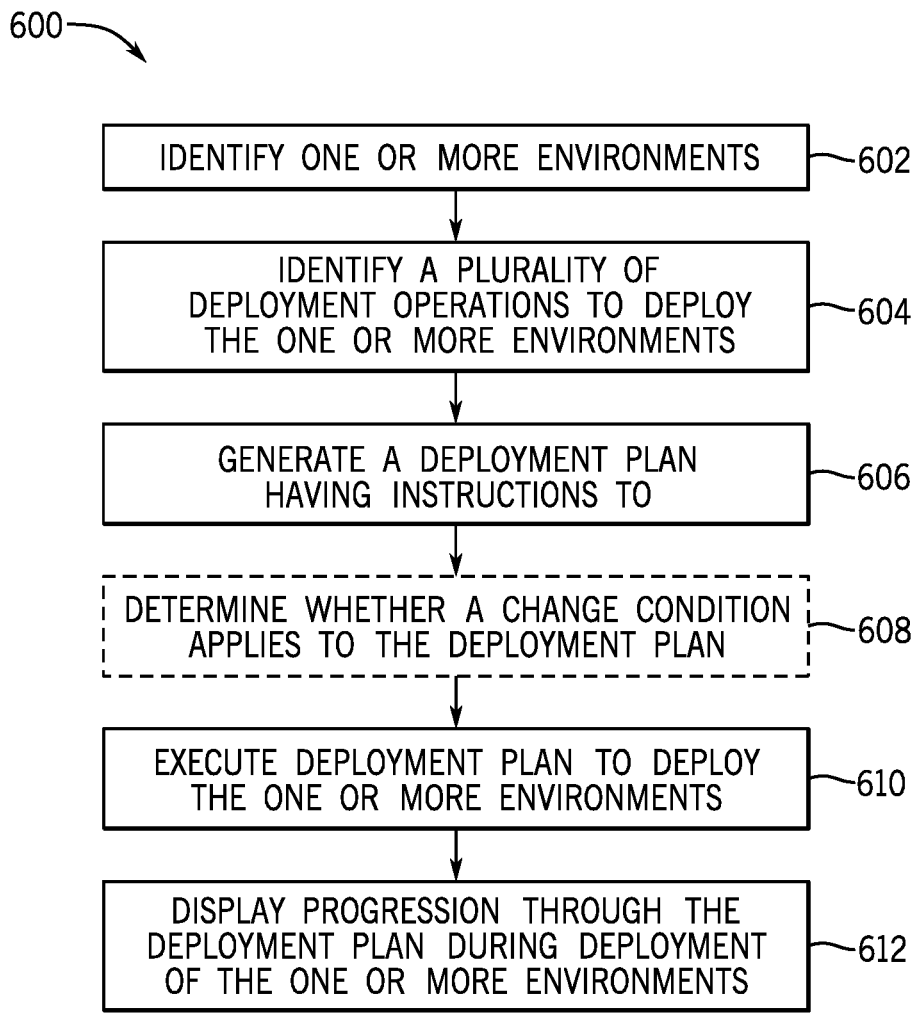
FIG. 15 is a flow chart of a process performed by the computing device to manage releases and deployments, in accordance with an embodiment.

FIG. 15 is a flow chart of a process 600 that may be performed by the processor 202. The process 600 may be stored in the memory 206 and executed as instructions (e.g., routines, functions, interrupts, etc.), which may be encoded in programs or code stored in the memory 206 and executed by the processor 202 (e.g., running code). The processor 24 of the system 320 may be configured to store, retrieve, and/or execute instructions associated with the process 600. The process 600 may include identifying one or more environments (block 602). The process 600 may include identifying a plurality of deployment operations to deploy the one or more environments (block 604). The process may include generating a deployment plan having instructions to execute the one or more deployment operations (block 606). In some embodiments, the process 600 may include calculating a risk score based on connectivity, application metrics, package links, and developer scores, among others, to determine whether additional testing prior to deploying the one or more environments (e.g., to production). For example, the processor 202 may provide a high risk score if developers associated with a package have a history of packages that include errors, the processor 202 may suggest additional testing prior to deploying the one or more environments. In some embodiments, the process 600 may include determining whether a change condition applies to the deployment plan (block 608). If no change condition applies or if a change condition applies and the deployment is approved, the process 600 may continue by executing the deployment plan to deploy the one or more environments (block 610). The process 600 may include displaying progression through the deployment plan during deployment of the one or more environments (block 612). The process 600 may then include providing feedback regarding the deployment to the one or more release environments. For example, if there are one or more issues during the deployment, the issues may be tracked as tasks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
one or more hardware processors; and
a non-transitory memory, the non-transitory memory storing computer-readable instructions that, when executed by the one or more hardware processors, causes the one or more hardware processors to perform actions comprising:
receiving, via a deployment user interface, a request from a first user to deploy a software application to one or more release environments;
generating a deployment plan comprising instructions to execute a plurality of deployment operations to deploy the software application to the one or more release environments, wherein generating the deployment plan comprises receiving, via the deployment user interface, user inputs from the first user defining a change condition of the deployment plan, wherein the change condition requires that, prior to executing the deployment plan, when the one or more release environments include at least one production environment, an approval is received from a second user authorized to deploy software applications in the at least one production environment;
calculating a risk score for deploying the software application to the one or more release environments based at least in part on connectivity within the one or more release environments, package links of the software application, or any combination thereof;

in response to determining that the risk score is greater than a threshold value, providing indications of additional testing to be performed on the software application before executing the deployment plan;
in response to determining that the one or more release environments include the at least one production environment, pausing deployment of the software application based on the change condition; and
in response to receiving the approval of the second user for the change condition:
executing the deployment plan to deploy the software application to the one or more release environments; and
displaying, to the first user via the deployment user interface, progression through the deployment plan during deployment of the software application to the one or more release environments.

2. The system of claim 1, wherein the deployment plan is generated based on an input from the first user indicative of dragging and dropping a graphical icon in the deployment user interface, wherein dragging and dropping the graphical icon connects the graphical icon to a deployment icon corresponding to the deployment plan.

3. The system of claim 1, wherein the actions comprise identifying a relationship between a first deployment operation and a second deployment operation in the deployment plan, wherein the relationship comprises a dependency between the first deployment operation and the second deployment operation, and wherein the first deployment operation is performed before the second deployment operation based on the dependency.

4. The system of claim 1, wherein the actions comprise providing, via the deployment user interface, a non-alphanumeric graphical object that presents an indication of an error during the progression through the deployment plan.

5. The system of claim 4, wherein the actions comprise:
generating, in response to the error, a task in a task table in the non-transitory memory, wherein the task initially has an open state;
receiving, from a third user assigned to the task within the task table, an indication that that the task has been completed, and in response, modifying the task within the task table to have a closed state; and
in response to determining that the task has a closed state within the task table, restarting execution of the deployment plan to deploy of the software application to the one or more release environments.

6. The system of claim 1, wherein the one or more release environments are associated with one or more configuration items (CIs), wherein the one or more CIs comprise hardware resources and software resources of a communicatively coupled client network, and wherein the non-transitory memory comprises a configuration management database (CMDB) that stores discovered information for each of the one or more release environments associated with the one or more CIs.

7. The system of claim 1, wherein the actions comprise: identifying a resource installed on the one or more release environments, wherein the deployment plan is executed based on the identified resource, wherein the instructions of the deployment plan are customized and specific to the one or more release environments based on the identified resources.

8. The system of claim 1, wherein the risk score is calculated based at least in part on application metrics of the software application, a developer score of a developer of the software application, or any combination thereof.

9. The system of claim 1, wherein the second user has permissions to deploy the software application in the at least one production environment based on a role or group of the second user.

10. The system of claim 1, wherein the plurality of deployment operations to deploy the software application to the one or more release environments comprise installing a load balancer, installing a web application server, and installing a database to the one or more release environments.

11. The system of claim 1, wherein generating the deployment plan comprises:
receiving, via the deployment user interface, a selection of a release template for the deployment plan, wherein the release template is associated with a production phase workflow and with a patch release, a major release, or a minor release of the software application, and wherein the production phase workflow defines the plurality of deployment operations of the deployment plan.

12. A method, comprising:
receiving, via a deployment user interface, a request from a first user to deploy a software application to one or more release environments;
generating a deployment plan comprising instructions to execute a plurality of deployment operations to deploy the software application to the one or more release environments, wherein generating the deployment plan comprises receiving, via the deployment user interface, user inputs from the first user defining a change condition of the deployment plan, wherein the change condition requires that, prior to executing the deployment plan, when the one or more release environments include at least one production environment, an approval is received from a second user authorized to deploy software applications in the at least one production environment;
calculating a risk score for deploying the software application to the one or more release environments based at least in part on connectivity within the one or more release environments, package links of the software application, or any combination thereof;
in response to determining that the risk score is greater than a threshold value, providing indications of additional testing to be performed on the software application before executing the deployment plan;
in response to determining that the one or more release environments include the at least one production environment, pausing deployment of the software application based on the change condition; and
in response to receiving the approval of the second user for the change condition:
executing the deployment plan to deploy the software application to the one or more release environments; and
displaying, to the first user via the deployment user interface, progression through the deployment plan during deployment of the software application to the one or more release environments.

13. The method of claim 12, wherein the deployment plan is generated based on an input from the first user indicative of dragging and dropping a graphical icon in the deployment user interface, wherein dragging and dropping the graphical icon connects the graphical icon to a deployment icon corresponding to the deployment plan.

14. The method of claim 12, comprising identifying a relationship between a first deployment operation and a second deployment operation in the deployment plan, wherein the relationship comprises a dependency between the first deployment operation and the second deployment operation, wherein the first deployment operation is performed before the second deployment operation based on the dependency.

15. The method of claim 12, comprising:
providing, via the deployment user interface, an indication of an error during the progression through the deployment plan;
generating, in response to the error, a task in a task table, wherein the task initially has an open state; and
in response to determining that the task has been updated to a closed state within the task table, restarting execution of the deployment plan to deploy of the software application to the one or more release environments.

16. A non-transitory computer-readable medium comprising computer-readable code, that when executed by one or more processors, causes the one or more processors to perform actions comprising:
receiving, via a deployment user interface, a request from a first user to deploy a software application to one or more release environments;
generating a deployment plan comprising instructions to execute a plurality of deployment operations to deploy the software application to the one or more release environments, wherein generating the deployment plan comprises receiving, via the deployment user interface, user inputs from the first user defining a change condition of the deployment plan, wherein the change condition requires that, prior to executing the deployment plan, when the one or more release environments include at least one production environment, an approval is received from a second user authorized to deploy software applications in the at least one production environment;
calculating a risk score for deploying the software application to the one or more release environments based at least in part on connectivity within the one or more release environments, package links of the software application, or any combination thereof;
in response to determining that the risk score is greater than a threshold value, providing indications of additional testing to be performed on the software application before executing the deployment plan;
in response to determining that the one or more release environments include the at least one production environment, pausing deployment of the software application based on the change condition; and
in response to receiving the approval of the second user for the change condition:
executing the deployment plan to deploy the software application to the one or more release environments; and
displaying, to the first user via the deployment user interface, progression through the deployment plan during deployment of the software application to the one or more release environments.

17. The non-transitory computer-readable medium of claim 16, wherein the deployment plan is generated based on an input from the first user indicative of dragging and dropping a graphical icon in the deployment user interface, wherein dragging and dropping the graphical icon connects the graphical icon to a deployment icon corresponding to the deployment plan.

18. The non-transitory computer-readable medium of claim 16, wherein the actions comprise:
providing, via the deployment user interface, a non-alphanumeric graphical object that presents an indication of an error during the progression through the deployment plan;
generating, in response to the error, a task in a task table, wherein the task initially has an open state;
receiving, from a third user assigned to the task within the task table, an indication that the task has been completed, and in response, modifying the task within the task table to have a closed state; and
in response to determining that the task has a closed state within the task table, restarting execution of the deployment plan to deploy of the software application to the one or more release environments.

19. The non-transitory computer-readable medium of claim 16, wherein the actions comprise:
identifying resources installed on the one or more release environments.

20. The non-transitory computer-readable medium of claim 19, wherein deployment plan is executed based on the identified resources, wherein the instructions of the deployment plan are customized and specific to the one or more release environments based on the identified resources.

* * * * *